Nov. 26, 1968   P. M. MacKINNEY   3,413,630
MOVING EVENTS DISPLAY DEVICE
Filed Feb. 25, 1966                                     2 Sheets-Sheet 1
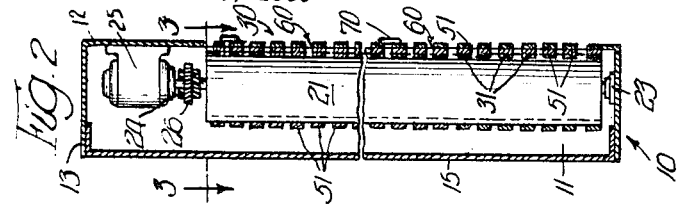
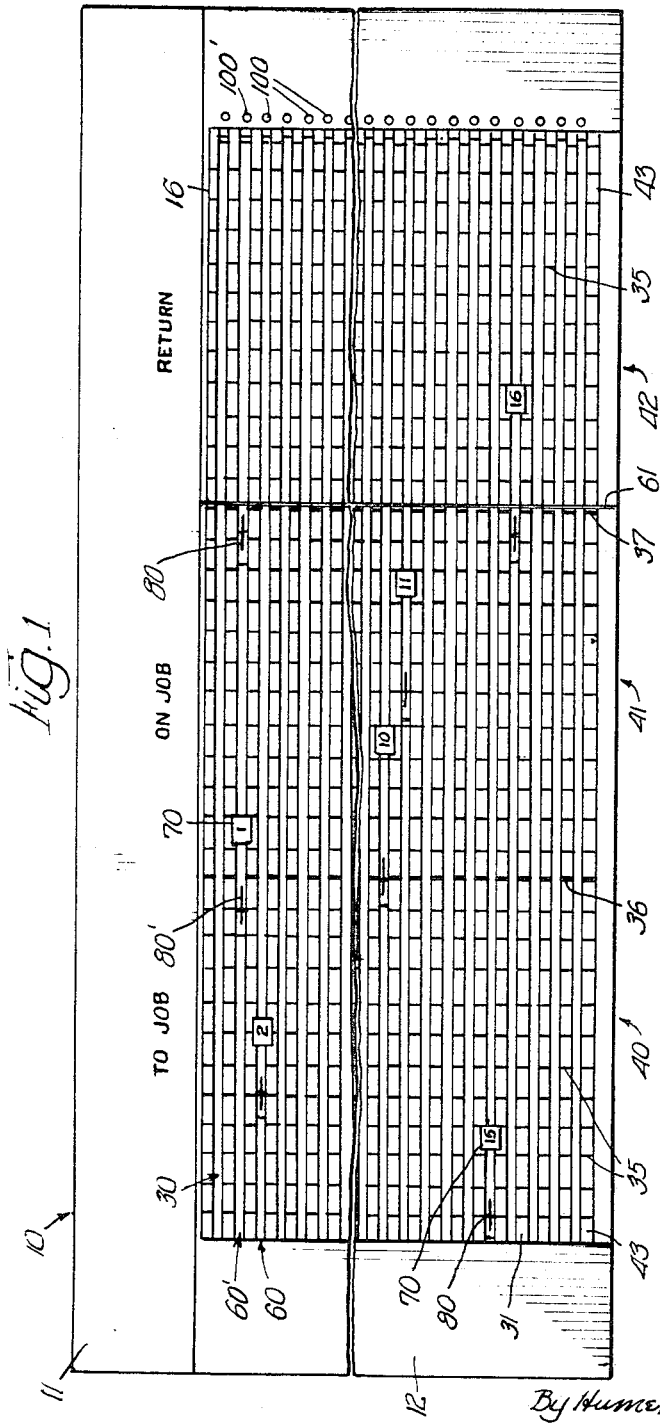
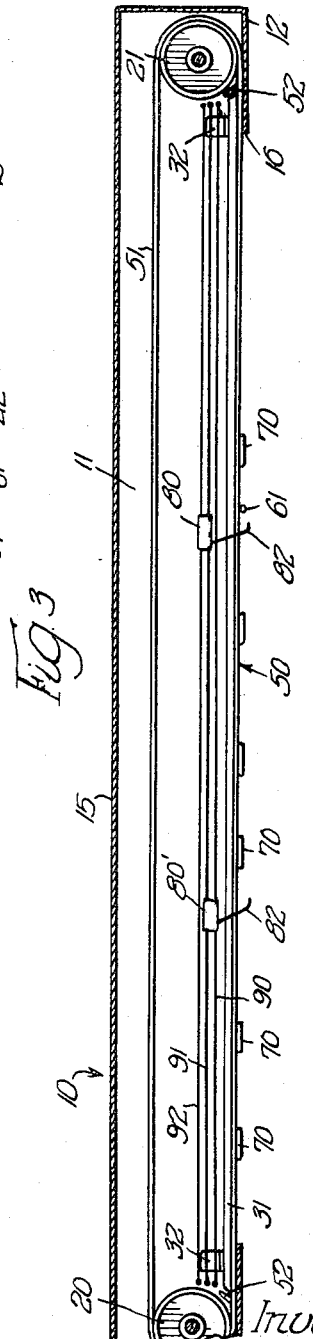
Inventor:
Paul M. MacKinney,
By Hume, Brown, Clement & Hume
Attys

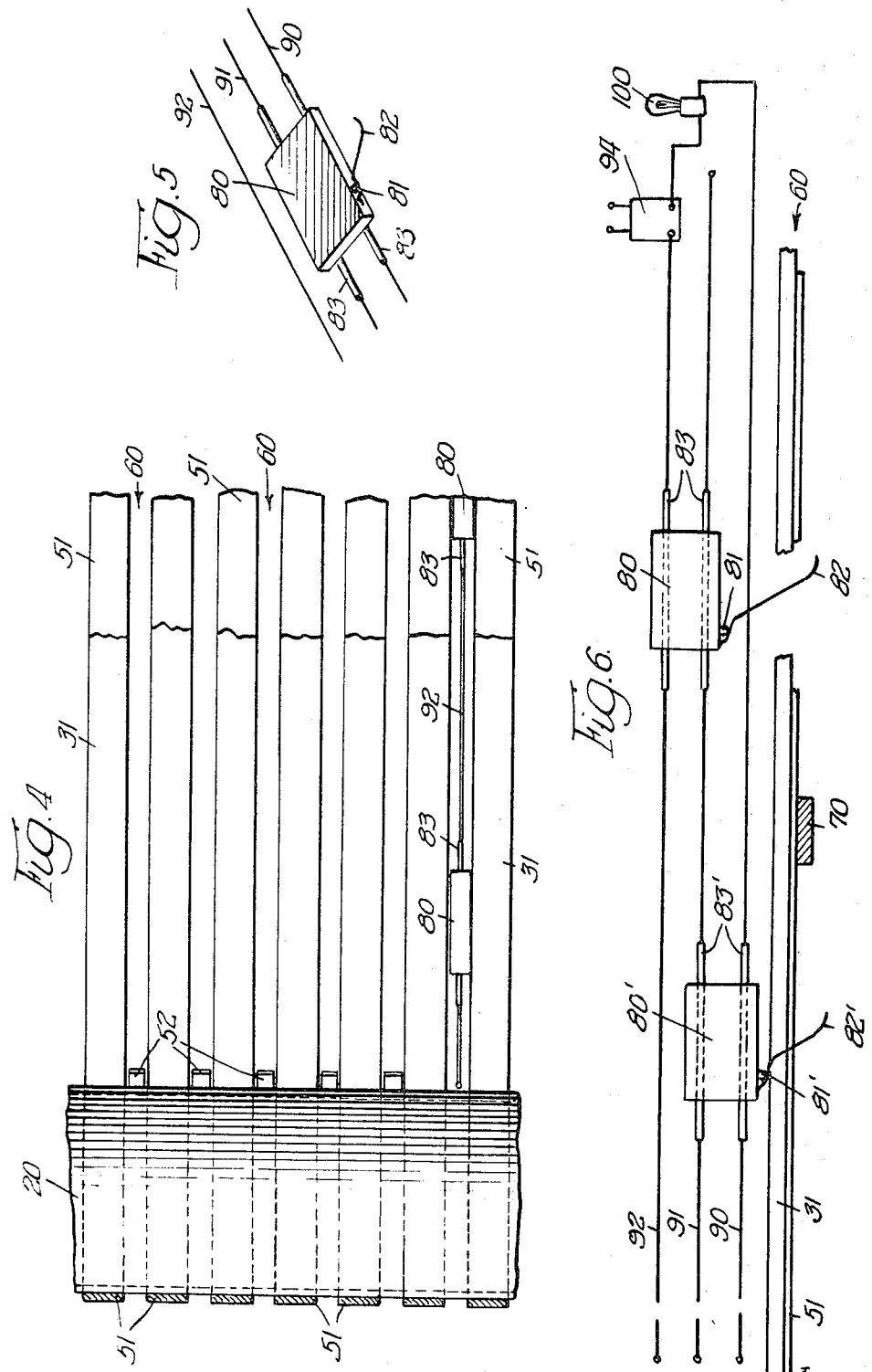

United States Patent Office 3,413,630
Patented Nov. 26, 1968

3,413,630
MOVING EVENTS DISPLAY DEVICE
Paul M. Mac Kinney, 1012 E. Geneva Road,
Wheaton, Ill. 60187
Filed Feb. 25, 1966, Ser. No. 530,109
11 Claims. (Cl. 340—309.1)

This invention relates generally to a data control device, and more particularly relates to a data control device which provides a signal indicative of the status of an operation.

Many industries employ personnel or equipment on projects which require a repetition of a sequence of operations within a given time interval, or which require the completion of a particular operation within a given time. Therefore, some type of control system must be employed in connection with such operations to register the progress or completion of the operation, or to provide readily-identifiable signals indicative of the status of the various personnel or equipment deployed. For example, the transportation industry is often required to employ a large fleet of vehicles and drivers to deliver people, or products such as building materials, ready-mix concrete and the like, to a particular location on a repetitive basis. Since the economical operation of such a fleet requires a continual accounting of the progress or location of all of the vehicles or personnel deployed, the need for a control system which would provide the necessary data quickly and economically is readily apparent.

Therefore, it is the principal object of this invention to provide a data control device.

It is another object of this invention to provide a data control device which can be readily adapted to furnish information for controlling various timed or sequential operations.

Additional objects and features of the present invention will become apparent from the following description of an embodiment adapted for controlling the dispatching of a fleet of trucks, taken in conjunction with the accompanying drawings.

In these drawings:

FIGURE 1 is an elevational view of a data control device embodying the features of the present invention;

FIGURE 2 is a cross-sectional view taken along the line 2—2 in FIGURE 1;

FIGURE 3 is a cross-sectional view taken along the line 3—3 in FIGURE 2;

FIGURE 4 is a fragmentary rear view in partial section of the control device illustrated in FIGURES 1, 2 and 3;

FIGURE 5 is a perspective view of a signalling mechanism adapted for use in this invention; and FIGURE 6 is a schematic view of an electrical circuit for the signalling mechanism illustrated in FIGURE 5.

Referring generally to these drawings, it will be seen that this invention contemplates the provision of a data control device 10 which includes a grid portion 30, a movable belt portion 50 and a signalling element, generally indicated by the reference numeral 70. The grid portion 30 is ruled or otherwise provided with indicia representative of the operation or sequence of operations to be controlled, and the belt portion 50 carries the signalling element 70 over the grid 30 at a predetermined rate of travel. In accordance with this invention, the belt portion 50 will thereby advance the signalling element 70 over the ruled grid portion 30 to a predetermined position which registers a signal indicative of the status or condition of the operation being controlled. Futhermore, the control device 10 embodying the features of this invention is adaptable to provide control information for a plurality of operations simultaneously.

Referring to FIGURES 1 and 2 in more detail, the control device 10 includes a rectangular housing structure 11 formed from a face plate 12, and top and bottom plates 13 and 14, respectively, If desired, the housing 11 can also be provided with a removable back plate 15. As seen in FIGURE 1, the face plate 12 is formed with an elongate or rectangular opening 16 to receive the grid portion 30. By this arrangement, the grid portion 30 is clearly visible from the face or front of the data control device 10.

The grid portion 30 of the control device 10 comprises a series of equally-spaced elongate grid rails 31. These grid rails 31 are extended longitudinally within the opening 16 in the face plate 12 and, as shown in FIGURE 3, are rigidly supported in such a position by securing each of their ends to an upstanding frame bracket member 32. The spaced rails 31 preferably occupy the entirety of the opening 16 in the face plate 12, and are preferably made from a strong magnetic material such as steel.

FIGURE 1 further illustrates that the front portion of each of the rails 31, visible within the housing opening 16, is divided into longitudinal segments by a series of minor markings 35. These minor markings 35 are placed on the rails 31 in transversely-spaced positions so that each marking is representative of a predetermined status or condition of the particular operation being controlled. Each of the rails 31 is further provided with major transverse markings 36 and 37 dividing the rails 31 into major longitudinal segments. These major markings 36 and 37 are also placed on the rails 31 in a position indicating predetermined stages or changes in condition of the operation being controlled.

In the preferred embodiment of this invention, wherein the control device 10 is adapted to control the dispatching of a fleet of trucks, the minor markings 35 and the major markings 36 and 37 are placed on the rails 31 in transverse alignment, as seen in FIGURE 1. In addition, the major markings 36 and 37 are positioned to divide the grid portion 30 of the control device 10 into three equal major segments 40, 41 and 42. Further, each of the major segments 40, 41 and 42 are subdivided by the minor markings 35 into longitudinal segments 43 of equal length. As seen in FIGURE 1, the major segment 40 in the embodiment is representative of the status of a truck in transit to a particular job, the major segment 41 is representative of the status of a truck on the job, and the major segment 42 is representative of the status of a truck returning from the job. The longitudinal segments 43, defined on the rails 31 by the minor markings 35, are also chosen to represent equal units of time, such as five minutes. The minor markings 35 therefore divide the major segments 40, 41 and 42 of the grid portion 30 into an equal number of longitudinal segments 43 representative of a predetermined unit of time.

Referring to FIGURES 2 and 3, the control device 10 is further provided with a pair of spaced rollers 20 and 21 mounted in an upstanding position within the housing 11. The rollers 20 and 21 are preferably positioned closely adjacent the face plate 12 at opposite ends of the face plate opening 16, as seen in FIGURE 3. Roller bearings 23 are provided to support the ends of rollers 20 and 21 in the proper position within the housing 11. The roller bearings 23 also permit the rollers 20 and 21 to be rotated within the housing 11. As clearly seen from FIGURE 2, the roller 21 is further provided with a worm gear 24, and the control device 10 is provided with a constant speed motor assembly 25 adjacent the worm gear 24. A pinion 26 of the motor assembly 25 is engaged with the worm gear 24. The motor assembly 26 is therefore capable of driving the roller 21 at a constant speed during the operation of the data control device 10.

In accordance with this invention, the movable belt portion 50 of the control device 10 is placed in engagement with the upstanding rollers 20 and 21, and can be driven by the powered roller 21 at a predetermined constant speed. More particularly, the belt portion 50 in the preferred embodiment of this invention comprises a plurality of individual continuous belts 51. As seen in FIGURES 2, 3 and 4, these individual continuous belts 51 are mounted on the rollers 20 and 21 in transversely-spaced positions corresponding to the spacing of the grid rails 31. A rake 52 is mounted on the face plate 12 of the control device 10, adjacent each of the rollers 20 and 21, to assure that the belts 51 are maintained in their proper transverse positions. By such an arrangement, an individual belt 51 is positioned along the front surface of each grid rail 31, and is capable of moving longitudinally along the grid rail 31 when the powered roller 21 is actuated. In the preferred embodiment of this invention, the belts 51 are constructed from a strong transparent plastic material so that they maintain their shape and permit the markings 35, 36 and 37 on the rails 31 to be clearly visible from the front of the control device 10.

As seen in FIGURES 1 and 2, the spaced belts 51 and the grid rails 31 therefore provide the grid portion 30 of the control device 10 with a plurality of open longitudinal channels between adjacent grid rails 31. These open channels thereby define longitudinal job track 60 which can be selected to represent one of the operations being controlled. In this preferred embodiment, for instance, each of the job tracks 60 represents the status of one or more of the trucks being dispatched to deliver material to the job under control. As a result of this arrangement, the control device 10 can be readily utilized to provide control data for a plurality of jobs or operations simultaneously.

The control device 10 is further provided with a signalling element 70 for each of the job tracks 60. These signal elements 70 are attachable to the belts 51 adjacent the job tracks 60, and are moved by the belts along the job tracks during the operation of the control device 10. Each of the signalling elements 70 will therefore indicate the status of the operation represented by the particular job track 70 along which it is moved. In this embodiment, each element 70 is selected as identifying one of the trucks employed on the job being controlled.

To allow ready identification of the individual signalling elements, each signal element 70 can be provided with distinctive indicia, such as the numerals shown in FIGURE 1. In addition, it is preferred that the signalling elements 70 be constructed from magnetized metal so that they can be readily positioned on the front of adjacent steel grid rails 31, spanning a job track 60, by magnetic attraction through the belts 51. Since the markings 35, 36 and 37 are visible through the transparent belts 31, the timed advancement of each of the signalling elements 70 along each of the job tracks 60 can be readily observed. Thus, in this embodiment, the status or location of each truck represented by one signalling element 70 and one job track 60 is readily indicated by the position of the signalling element 70 with respect to the markings 35, 36 and 37.

As seen in FIGURES 1 and 3, the preferred embodiment of the control device 10 is also provided with a barrier wire 61 extending transversely across the front of the grid portion 30. This barrier wire 61 is further positioned closely adjacent to the front of the movable belts 51 so that the wire will engage with the signalling elements 70 being advanced by the belts. The barrier wire 61 can thus be arranged in a longitudinal position on the grid portion 30 of the the control device 10 to prevent the advancement of the signalling elements 70 beyond a predetermined position. In this embodiment, as seen in FIGURE 1, the barrier wire 61 is extended adjacent the marking 37 between the major grid segments 41 and 42. The barrier wire 61 will therefore prevent any of the signalling elements 70 from being automatically carried by the belts 51 from the "ON JOB" major grid segments 41 to the "RETURN" major grid segment 42.

From the above description it is apparent that the signalling elements 70 can be originally placed on the adjacent belts 51, across a job track 60, at the desired longitudinal position indicative of the original status of the operation which the signalling element 70 represents. The belts 51 will thereafter move the signalling element 70 longitudinally along the jobtrack 60 at a predetermined rate, and change the position of the element 70 with respect to the markings 35, 36 and 37 on the grid portion 30. The relative position of the signalling element 70 on the ruled grid portion 30 will therefore indicate any change in the status of the particular operation which the signalling element 70 represents.

The control device 10 also includes a switching mechanism for each job track 60 which can be selectively adjusted to provide an electrical signal when the operation represented by the job track 60 reaches a predetermined stage. In this regard, FIGURES 3 and 4 illustrate that each job track 60 is provided with one or more signal switches 80. Each switch 80 is slidably mounted behind a job track 60 upon uninsulated conducting wires 90, 91 or 92. As seen in FIGURE 3, the wires 90, 91 and 92 are separately suspended within the housing 11 parallel to each job track 60, and extend the full longitudinal length of the job track 60. Accordingly, each switch 80 can be moved along the conducting wires 90, 91 or 92 to any desired longitudinal position along the job track, and can be arranged to provide an electrical signal, to operate a bell or a light and the like, when the operation represented by the particular job track reaches a predetermined stage.

The perspective view in FIGURE 5 illustrates that the signal switch 80 in this embodiment comprises a miniaturized limit switch having an actuating nib 81 and a projecting whisker wire 82. The whisker wire 82 extends outwardly from the switch 80, and is positioned to actuate the nib 81, to either open or close the switch 80, when the whisker wire is depressed. The switch 80 also includes a pair of parallel conducting tubes 83 which are electrically connected when the switch 80 is closed.

As seen in FIGURES 5 and 6, the switch 80 in this embodiment is positioned adjacent a job track 60 by extending two of the three conducting wires 90, 91 and 92 through the two conducting tubes 83 of the switch. The switch 80 can thus be moved to any desired position behind a job track 60 by sliding the tubes 83 along the wires 91, 92 or 93. Since the wires 90, 91 and 92 are not insulated, the switch 80 will operate to join the wires upon which it is mounted when the switch is closed. FIGURE 6 illustrates that the switch 80 is mounted on two of the wires 90, 91 or 92 in a position which causes the whisker wire 82 of the switch to project outwardly between adjacent rails 31 into the adjacent job track 60. By such an arrangement, the whisker wire 82 will be depressed, and the switch 80 will be actuated, when one of the signalling elements 70 is moved along the job track 60 past the switch 80. The switch 80 can therefore be arranged at infinitely variable locations along a job track 60 to provide an electrical signal when the belts 31 move a signalling element 70 to any predetermined position.

FIGURE 6 illustrates a preferred arrangement of signal switches for each of the job tracks 60 of the control device 10. As seen in FIGURE 6, each job track 60 is provided with an electrical circuit connected to a suitable electrical source (not shown) through a transformer 94. A suitable signalling device, such as an electric light 100, is provided in each job track circuit across the conducting wires 90 and 92, and each job track circuit is provided with two signal switches 80 and 80'. As further seen in FIGURE 6, the switch 80 is mounted across the conducting wires 91 and 92, and the switch 80' is mounted across the conducting wires 90 and 91. Since the wire 90 is not connected to the wire 92, the circuit for energizing the light 100 is broken, unless both of the switches 80 and 80' are closed. In this preferred arrangement, as shown in FIGURE 6, the switch 80' is normally closed, and electrically connects the wires 90 and 91 of the job track 60 unless its whisker wire 82' is depressed by a signalling element 70. Furthermore, the switch 80 in FIGURE 6 is normally open, and will electrically connect the longitudinal wires 91 and 92 only when its whisker wire 82 is depressed.

To employ the data control device 10 for dispatching a fleet of trucks to a plurality of jobs, each of the job tracks 60 is selected to represent the status of one of the plurality of jobs. In addition, the minor longitudinal segments 43 of the grid portion 30 are selected to represent a given unit of time. As seen in FIGURE 1, the major segments 40, 41 and 42 of the grid portion 30 have been chosen to indicate the time consumed by each truck going to the job, on the job, and returning from the job, respectively.

The speed of the motor assembly 25 is also selected to advance the belts 51 along the grid portion 30 of the control device 10 at a predetermined constant speed, such as one inch every five minutes. In this illustrated embodiment, the motor assembly 25 is operative to advance the continuous belts 51 along the grid rails 31 in a rightward direction as seen in FIGURE 1, a distance equal to the length of the minor grid segment 43 every five minutes. The minor segments 43 are therefore representative of five minutes of time. The preparation for employing the control device 10 to dispatch a fleet of trucks is completed by arranging the switches 80 at the desired positions along the job tracks 60. The motor assembly 25 can then be energized to continuously drive the belts 51 along the grid rails 31. In this starting condition, the circuit shown in FIGURE 6 is broken by the switch 80, and the light 100 for each job track 60 is not illuminated.

To begin the dispatching of trucks to the jobs being controlled, one or more signal elements 70, each representing one truck, is placed on the moving belts 51 across one of the job tracks 60 at a position representative of the time required for the truck to reach its job. For instance, if it will require thirty minutes for the truck to reach its job, the signalling element 70 would be placed on a job track 60 in a "TO JOB" position, six minor grid segments (43) away from the major marking 36, to the left as viewed in FIGURE 1. Since the motor assembly 25 will move the belts 51 one segment 43 every five minutes, the belts 51 will therefore advance the signal element 70 to the major marking 36, and into the "ON JOB" segment of the control device, within a thirty-minute time interval. The control device 10 will then indicate that the truck represented by the signalling element 70 has changed status, and is now on the job.

As the truck consumes time on the job, the amount of time lapsed will be indicated by the longitudinal advancement of the signalling element 70 across the "ON JOB" segment 41 of the control device 10. The control device 10 thus also functions to register information as to the "ON JOB" status of the dispatched truck represented by signalling element 70. In this embodiment, as seen in FIGURE 1, the barrier wire 61 will engage the signalling element 70 and prevent the automatic movement of the signalling element from the "ON JOB" segment 41 to the "RETURN" segment 42. The truck dispatcher using the control device 10 is therefore given an opportunity to receive information confirming that the truck has left the job site before the element 70, representing the truck, is placed on the "RETURN" segment 42.

Moreover, the signal switches 80 and 80', illustrated in FIGURE 6, can be selectively positioned along the job track 60 to close the job track electrical circuit, and energize the job track light 100 when the signalling element 70 is advanced to a predetermined position along the job track. Thus, as seen in FIGURE 1, the normally-open switch 80 can be positioned along the job track 60' closely adjacent the major marking 37 which separates the "ON JOB" and "RETURN" segments of the control device 10. Accordingly, the whisker wire 82 on the switch 80 will be depressed, and the electrical circuit as shown in FIGURE 6 will be completed, when the signalling element 70 is moved to the end of the "ON JOB" segment of the job track 60'. The light 100' for the job track 60' will thereby be energized, and provide the truck dispatcher with a clear signal that a truck is ready to leave the job site. This light 100' will remain illuminated as long as the signalling element 70 is in a position to depress the whisker wire 82 of the switch 80 of the job track 60'.

In addition, the other switch 80' can be stationed at any desired location along the job track 60' where it is desired to have the job track electrical circuit opened. For instance, the switch 80' can be placed within the "ON JOB" segment 42 of the job track 60' at a location representative of the starting position of a second truck dispatched to the job to replace the first truck. Thus, a second signalling element 70 representing the second truck can be placed directly over the switch 80', to depress the switch whisker wire 82', and thereby open the job track electrical circuit.

By such an arrangement, the switches 80 and 80' cooperate to energize the light 100 for the job track 60' when a first truck is prepared to leave the job site, and to de-energize the light 100 when a second truck is dispatched to the job. More particularly, the barrier wire 61, as seen in FIGURE 1, will hold the advancing signal element 70, representing the first truck, in a position over the switch 80 and energize the light signal 100 as long as the truck dispatcher fails to remove the signalling element from over the switch 80, or until a second element 70 is placed over the other switch 80'.

From the above description it is apparent that this invention provides a data control device 10 which will readily indicate the status of a job or operation. More particularly, the control device 10, providing a plurality of job tracks 60, can readily provide control information for a plurality of jobs or operations simultaneously. Furthermore, the control device 10 in accordance with this invention includes a plurality of infinitely positionable signalling switches 80 which can be located on the control device to energize an electrical signal indicative of a predetermined job status.

It should be understood that the foregoing is merely illustrative of an embodiment of this invention, and that various modifications in the structural and functional features of this data control device may be devised by those skilled in the art without departing from the scope of this invention, as set forth in the accompanying claims.

What is claimed is:

1. A job control device for registering job information comprising a rigid frame structure, a grid structure supported by said frame structure and defining a longitudinal job track, indicia means transversely dividing the front portion of said job track into a plurality of segments of predetermined length, a continuous belt member supported by said frame structure and extending longitudinally along said front portion of said job track, means to move said belt member longitudinally along said job track at a predetermined rate of travel, and a signalling element securable to said belt member for movement therewith along said longitudinal job track into successive longitudinal positions, whereby the movement of said belt member carries said signalling element along said job track into varying longitudinal positions with respect to said indicia means to register data as to the status of a job being controlled.

2. The invention according to claim 1 wherein said grid structure includes a pair of spaced parallel grid rails supported in a longitudinal position by said frame structure, and wherein said spaced grid rails define said job track therebetween.

3. The invention according to claim 2 wherein said belt member defines an individual continuous belt extending longitudinally along and substantially co-extensive with each of said grid rails.

4. The invention according to claim 3 wherein said signalling element is securable to said belt extending along each of said spaced grid rails so that said signalling element spans said job track defined between said spaced grid rails.

5. The invention according to claim 4 wherein said job track includes a signal switch engagable with said signalling element to register an electrical signal as said signalling element is moved by said belt member to a predetermined longitudinal position along said job track.

6. The invention according to claim 5 wherein said signalling switch is infinitely positionable along the longitudinal length of said job track.

7. A job control device in accordance with claim 6 wherein said signal switch is slidably mounted along electrical conducting means extended longitudinally adjacent said job track.

8. The invention according to claim 4 wherein said job track includes a first signal switch engageable with a first signalling element to energize an electrical signal as said belt member moves said one element to a first predetermined longitudinal position along said job track, and wherein said job track further includes a second signal switch engageable with a second signalling element to de-energize said electrical signal when said second signalling element is placed on said job track adjacent said second signal switch.

9. A job control device for registering job information comprising a rigid frame structure, a plurality of parallel grid rails supported in spaced positions by said frame structure, an open longitudinal job track defined between adjacent grid rails, indicia means transversely dividing the front portion of each of said grid rails into a plurality of segments of predetermined length, a plurality of continuous belts supported by said frame structure, each of said belts extending longitudinally along said front of one of said grid rails, means to drive said belts longitudinally along said grid rails at a predetermined rate of travel, and a plurality of signalling elements, each of said elements being securable to said belts in a position spanning one of said job tracks so that the movement of said belts carries each of said elements longitudinally along one of said job tracks into varying longitudinal positions with respect to said indicia means, whereby said control device registers data as to the status of a job being controlled by each of said job tracks.

10. The invention according to claim 9 wherein each of said job tracks includes a signal switch engageable with said signalling element to register an electrical signal as said signalling element is moved by said belts to a predetermined longitudinal position along said job track.

11. The invention in accordance with claim 10 wherein said signal switch is slidably mounted along electrical conducting means extended longitudinally adjacent said job track, whereby said signal switch is infinitely positionable along the longitudinal length of said job track.

References Cited
UNITED STATES PATENTS 2,625,222   1/1953   Frye _____ 340—309.6
3,181,134   4/1965   Le Saint et al. _____ 340—309.4

EUGENE G. BOTZ, *Primary Examiner.*